(12) United States Patent  
Bishnoi et al.

(10) Patent No.: US 11,132,704 B2  
(45) Date of Patent: Sep. 28, 2021

(54) METHOD AND SYSTEM FOR ELECTRONIC VOUCHERS VIA BLOCKCHAIN

(71) Applicant: Mastercard International Incorporated, Purchase, NY (US)

(72) Inventors: Vikas Bishnoi, Rajasthan (IN); Navneet Kumar, Bihar (IN); Shubham Bijawat, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 257 days.

(21) Appl. No.: 15/642,814

(22) Filed: Jul. 6, 2017

(65) Prior Publication Data

US 2019/0012695 A1    Jan. 10, 2019

(51) Int. Cl.
*G06Q 20/02*    (2012.01)
*G06Q 30/02*    (2012.01)
(Continued)

(52) U.S. Cl.
CPC ......... *G06Q 30/0238* (2013.01); *G06Q 20/02* (2013.01); *G06Q 20/223* (2013.01);
(Continued)

(58) Field of Classification Search
None
See application file for complete search history.

(56) References Cited

U.S. PATENT DOCUMENTS 5,185,695 A * 2/1993 Pruchnicki ............. G06Q 20/20
                                                      235/385
9,489,681 B2 * 11/2016 Barous ............... G06Q 30/0239
(Continued)

FOREIGN PATENT DOCUMENTS

CN    105913174 A    8/2016
CN    105913272 A    8/2016
(Continued)

OTHER PUBLICATIONS

Antonopoulos, "Mastering Bitcoin—Unlocking Digital Cryptocurrencies", Dec. 20, 2014, pp. 1-298, O'Reilly Media, Inc., CA.
(Continued)

*Primary Examiner* — William J Jacob
(74) *Attorney, Agent, or Firm* — Buchanan Ingersoll & Rooney PC

(57) ABSTRACT

A method for redemption of an electronic voucher via blockchain includes: storing transaction data for a proposed payment transaction comprising a transaction amount; receiving an electronic voucher and a blockchain transaction identifier from a computing device, the voucher including payment credentials associated with a transaction account; receiving blockchain data associated with a blockchain including a transaction data value corresponding to the blockchain transaction identifier including a redemption amount; validating eligibility of the electronic voucher based on a comparison of the transaction data value to the stored transaction data; updating the stored transaction data based on the transaction data value, including updating the transaction amount based on the redemption amount; and transmitting the updated transaction data and the payment credentials included in the electronic voucher to a third party system.

14 Claims, 6 Drawing Sheets

(51) Int. Cl.
*G06Q 20/32* (2012.01)
*G06Q 20/22* (2012.01)
*G06Q 20/38* (2012.01)
*G06Q 20/36* (2012.01)

(52) U.S. Cl.
CPC ......... *G06Q 20/322* (2013.01); *G06Q 20/367* (2013.01); *G06Q 20/387* (2013.01); *G06Q 20/3825* (2013.01); *G06Q 30/0222* (2013.01)

(56) References Cited

U.S. PATENT DOCUMENTS

| | | | | |
|---|---|---|---|---|
| 2015/0278820 | A1* | 10/2015 | Meadows | G06Q 20/3821 705/64 |
| 2015/0324764 | A1 | 11/2015 | Van Rooyen et al. | |
| 2016/0012465 | A1 | 1/2016 | Sharp | |
| 2016/0267474 | A1 | 9/2016 | Lingham et al. | |
| 2016/0350792 | A1* | 12/2016 | Rajappa | G06Q 30/0236 |
| 2017/0140408 | A1 | 5/2017 | Wuehler | |
| 2017/0236177 | A1* | 8/2017 | Sebastian | G06Q 30/0639 705/14.11 |
| 2017/0372392 | A1* | 12/2017 | Metnick | G06Q 30/0613 |
| 2018/0025365 | A1* | 1/2018 | Wilkinson | G06Q 30/06 705/7.29 |
| 2018/0025401 | A1* | 1/2018 | Suhadolnik | G06F 16/252 705/26.35 |
| 2018/0101844 | A1* | 4/2018 | Song | H04L 9/3265 |
| 2018/0150865 | A1* | 5/2018 | Arora | G06Q 30/0225 |
| 2018/0165758 | A1* | 6/2018 | Saxena | G06Q 20/405 |
| 2018/0197173 | A1* | 7/2018 | Durvasula | G06Q 20/209 |
| 2018/0253745 | A1* | 9/2018 | Webster | G06Q 20/36 |

FOREIGN PATENT DOCUMENTS

| | | | |
|---|---|---|---|
| CN | 106157040 | A | 11/2016 |
| CN | 106408279 | A | 2/2017 |

OTHER PUBLICATIONS

Nakamoto, "A Peer-to-Peer Electronic Cash System", Oct. 31, 2008, pp. 1-9, URL:https//en.bitcoin.org/bitcoin.pdf.

"Colored Coins—Bitcoin Wiki", Retrieved from the Internet, Published on Jul. 7, 2015, URL:https//en.bitcoin.it/w/index.php?title-Colored_Coins&soldid-57529.

Notification of Transmittal of the International Search Report and the Written Opinion of the International Searching Authority (Forms PCT/ISA/220, PCT/ISA/210 and PCT/ISA/237) dated Jul. 26, 2018, by the European Patent Office in corresponding International Application No. PCT/US2018/035315. (12 pages).

Office Action dated Jun. 21, 2021, by the China National Intellectual Property Administration in corresponding Chinese Patent Application No. 201810726940.7 (9 pages) (waiting for the English Translation).

Office Action dated Jun. 21, 2021, by the China National Intellectual Property Administration in corresponding Chinese Patent Application No. 201810726940.7, and an English translation of the Office Action (9 pages).

* cited by examiner

METHOD AND SYSTEM FOR ELECTRONIC VOUCHERS VIA BLOCKCHAIN

FIELD

The present disclosure relates to the redemption of electronic vouchers that utilize a blockchain, specifically the storage of redemption details for an electronic voucher via blockchain for use by a recipient of the electronic voucher for validation of the electronic voucher, while the voucher itself includes payment credentials, to reduce the likelihood of fraud and provide greater visibility to merchants regarding outstanding vouchers.

BACKGROUND

Gift cards, gift certificates, and other types of vouchers that can be redeemed at one or more merchants can be useful tools for consumers. These vouchers are often useful as gifts, where the gift giver may want to gift something to the recipient, but are unsure of a specific product to buy, and can provide the recipient with the freedom to spend the amount of the voucher as they please. In many cases, vouchers can be beneficial for merchants too, as consumers will often purchase items greater than the total value of the voucher, resulting in extra spending at the merchant that the recipient of the voucher might not spend otherwise.

However, existing voucher systems can also be detrimental to merchants. Vouchers are generally not specific to a person, but instead are redeemable to the bearer, and only the value of the voucher is tracked by the issuer through its use in various transactions. Voucher fraud is often problematic for merchants, where a nefarious actor may create counterfeit vouchers that are mistakenly redeemed at a merchant or may steal voucher credentials from a genuine voucher and use them before the authorized recipient. In these cases, the merchant often has little or no recourse against the nefarious party, and thus either the proper recipient or the merchant loses the value of the voucher or merchandise that was fraudulently purchased. In addition, existing voucher systems often operate via the sale of vouchers through third parties, which may be later redeemed at the merchant. In many cases, the sale of these vouchers is not, and cannot, be tracked, leaving the merchant unaware as to the value of vouchers that are currently outstanding. In cases where a third party sells the voucher, the merchant may not receive any benefit directly from the sale of the voucher, and yet will still end up selling the equivalent amount in merchandise to the voucher's recipient, which can greatly imbalance the merchant's accounting during a given time period, depending on the system.

Thus, there is a need for a technical solution to provide for proper auditing of vouchers, including vouchers sold through third party entities, that can also prevent the use of fraudulent vouchers, in order to protect merchants while still maintaining the benefits and convenience of the use of vouchers to consumers.

SUMMARY

The present disclosure provides a description of systems and methods for the redemption of electronic vouchers via blockchain. An electronic voucher is issued from a transaction account, where the account details are stored in the voucher itself, which is conveyed to a point of sale device for payment. Additional details regarding the voucher, such as the amount, expiration, and merchant(s) where it may be redeemed, and stored in a publicly accessible blockchain. The use of the blockchain enables a merchant to quickly and easily identify the value of all vouchers that have yet to be redeemed, but may be redeemed at the merchant, while at the same time preventing fraud as the voucher's recipient may be able to prove ownership of the voucher via the data stored in the blockchain.

A method for redemption of an electronic voucher via blockchain includes: storing, in a memory of a point of sale device, at least transaction data for a proposed payment transaction comprising at least a transaction amount; receiving, by a receiving device of the point of sale device, at least an electronic voucher and a blockchain transaction identifier from a computing device, wherein the electronic voucher includes at least payment credentials associated with a transaction account; receiving, by the receiving device of the point of sale device, blockchain data associated with a blockchain, wherein the blockchain data includes at least a transaction data value corresponding to the blockchain transaction identifier, the transaction data value including at least a redemption amount; validating, by a validation module of the point of sale device, eligibility of the electronic voucher based on at least a comparison of the transaction data value to the stored transaction data; executing, by a querying module of the point of sale device, a query on the memory to update the stored transaction data based on the transaction data value, including updating at least the transaction amount based on the redemption amount; and electronically transmitting, by a transmitting device of the point of sale device, the updated transaction data and the payment credentials included in the electronic voucher to a third party system.

A system for redemption of an electronic voucher via blockchain includes: a memory of a point of sale device configured to store at least transaction data for a proposed payment transaction comprising at least a transaction amount; a receiving device of the point of sale device configured to receive at least an electronic voucher and a blockchain transaction identifier from a computing device, wherein the electronic voucher includes at least payment credentials associated with a transaction account, and receive blockchain data associated with a blockchain, wherein the blockchain data includes at least a transaction data value corresponding to the blockchain transaction identifier, the transaction data value including at least a redemption amount; a validation module of the point of sale device configured to validate eligibility of the electronic voucher based on at least a comparison of the transaction data value to the stored transaction data; a querying module of the point of sale device configured to execute a query on the memory to update the stored transaction data based on the transaction data value, including updating at least the transaction amount based on the redemption amount; and a transmitting device of the point of sale device configured to electronically transmit the updated transaction data and the payment credentials included in the electronic voucher to a third party system.

A method for generation and distribution of an electronic voucher includes: storing, in a memory of a computing device, at least payment credentials associated with a transaction account; receiving, by an input device interfaced with the computing device, instructions associated with a voucher request including at least a transaction account selection indicating the transaction account, one or more merchant identifiers, and a redemption amount; electronically transmitting, by a transmitting device of the computing device, at least the one or more merchant identifiers and the redemption amount to a computing node comprising a blockchain network; receiving, by a receiving device of the computing device, a transaction identifier from a computing node comprising the blockchain network, wherein the transaction identifier corresponds to a data value included in a block comprising a blockchain associated with the blockchain network; generating, by a generation module of the computing device, an electronic voucher, wherein the electronic voucher includes at least the payment credentials; and electronically transmitting, by the transmitting device of the computing device, at least the electronic voucher and the transaction identifier to a recipient computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
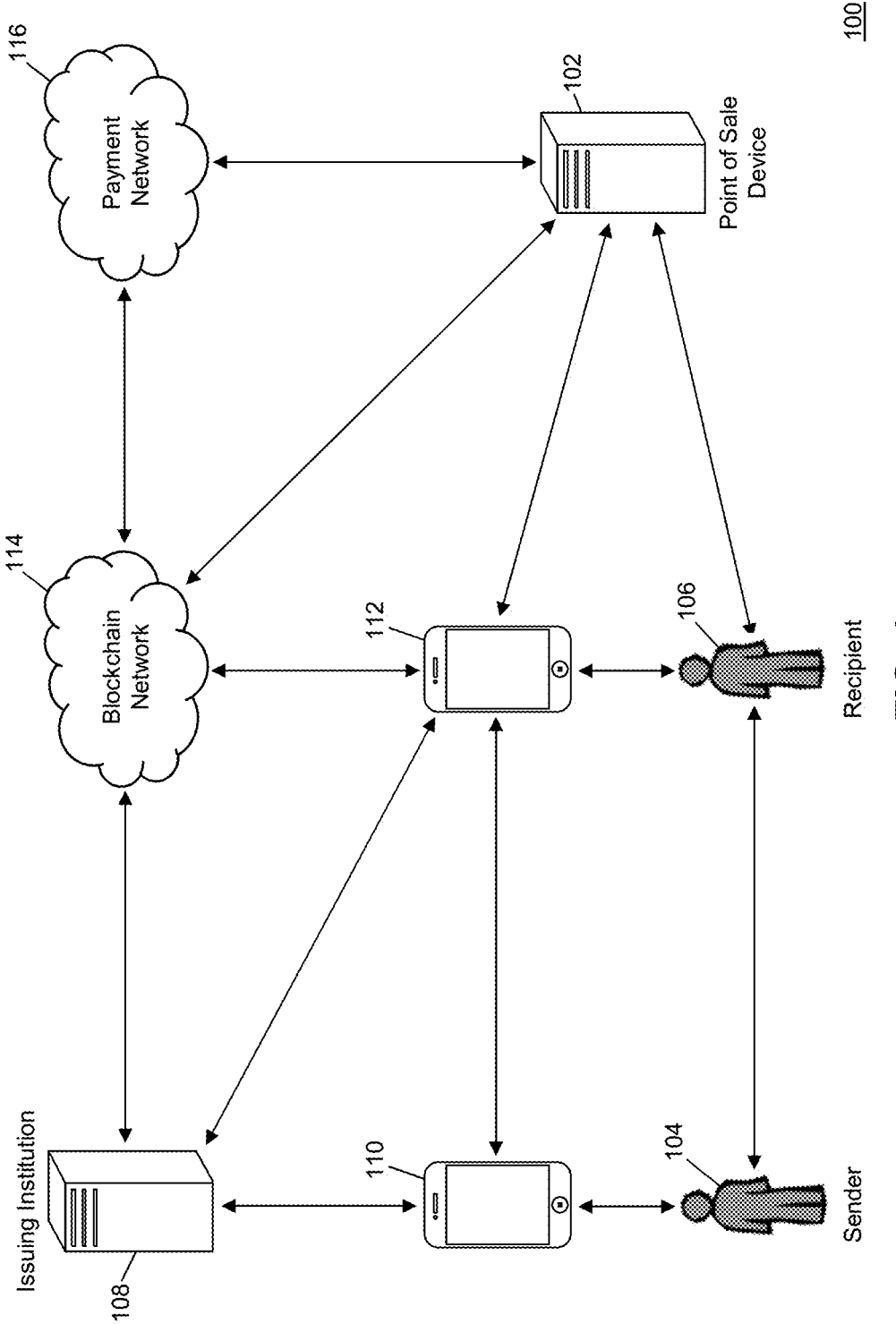
FIG. 1 is a block diagram illustrating a high level system architecture for redemption of electronic vouchers via blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Redemption of Electronic Vouchers Via Blockchain

FIG. 1 illustrates a system 100 for the redemption of electronic vouchers via the use of a blockchain to reduce the likelihood of fraud and provide for auditability of outstanding electronic vouchers.

The system 100 may include a point of sale device 102. The point of sale device 102, discussed in more detail below, may be a device associated with a merchant used to initiate payment transactions that is specifically configured to perform the functions discussed herein for the redemption of electronic vouchers as part of a payment transaction. In the system 100, a sender 104 may want to purchase an electronic voucher for a recipient 106, to be redeemed at the point of sale device 102. The sender 104 may have a transaction account issued by an issuing institution 108, which may be used to fund the payment transaction(s) conducted using the electronic voucher being purchased. The issuing institution 108 may be any type of financial institution, such as an issuing bank, configured to issue transaction accounts for use in funding payment transactions.

The sender 104 may possess a sender device 110, which may be used to purchase the electronic voucher, which may be subsequently delivered to a recipient device 112, possessed by the recipient 106. The sender device 110 and recipient device 112 may be any type of computing device specifically configured to perform the functions discussed herein, such as a desktop computer, laptop computer, notebook computer, tablet computer, cellular phone, smart phone, smart television, wearable computing device, implantable computing device, etc. The electronic voucher may be purchased through the issuing institution 108, the point of sale device 102, a blockchain network 114, or any other entity or system configured to manage or be otherwise associated with the electronic vouchers discussed herein. The sender device 110 and recipient device 112 may utilize one or more application programs to perform functions related to electronic vouchers, which may utilize web pages, application programming interfaces, or other methods for performing the functions discussed herein.

Using the sender device 110, the sender 104 may purchase an electronic voucher. As part of the purchasing process, the sender 104 may select a transaction account to be used to pay for the payment transaction(s) that utilize the voucher, a redemption amount that may be redeemed by the recipient 106 via the voucher, and one or more merchants with whom the voucher may be redeemed. In some instances, the sender 104 may also identify an expiration date, before which the voucher must be redeemed. In some cases, the expiration date may be set by the managing entity or by the merchant(s) with whom the voucher must be redeemed. The sender 104 may submit the data in a voucher request to the appropriate entity, such as the issuing institution 108, blockchain network 114, point of sale device 102, etc. The entity may receive the request, which may be forwarded on to a node comprising the blockchain network 114.

In embodiments where the voucher request is submitted to the issuing institution 108, the issuing institution 108 may first verify the transaction account to be used to fund the electronic voucher's transactions before forwarding the voucher request to the blockchain network 114. In other embodiments, the recipient of the voucher request (e.g., the blockchain network 114 or other intermediate entity) may contact the issuing institution 108 for verification of the transaction account. In such cases, the voucher request or data accompanying thereof may include a transaction account number or other identifying information associated with the transaction account selected by the sender 104. The issuing institution 108 may receive the identifying information, may identify the transaction account, and may verify that the transaction account is eligible for use in funding the electronic voucher, and has a suitable balance, credit limit, or other capacity to cover the redemption amount selected by the sender 104. If the verification fails, the sender 104 may be notified via their sender device 110, and may be provided with an opportunity to modify the redemption amount or select an alternative transaction account. If the verification succeeds, the blockchain network 114 may be notified accordingly, and, in some cases, the issuing institution 108 may place a hold on the transaction account for the redemption amount until the expiration date of the electronic voucher, to ensure that the redemption amount remains available for use by the transaction account.

Once the transaction account is verified, the voucher request may be submitted to one of a plurality of computing nodes that comprise the blockchain network 114, also referred to herein as blockchain nodes, which may be configured to generate and confirm new blocks that comprise a blockchain maintained through the plurality of nodes. The blockchain may be comprised of a plurality of blocks, where each block is comprised of a block header and one or more data values. Each block header may include at least a timestamp, a block reference value, and a data reference value. The timestamp may be a stamp of a time when the block header is generated. The block reference value may be a reference to the previous block (e.g., determined via timestamp) in the blockchain. In some cases, the block reference value may be a hash value generated via the application of one or more hashing algorithms to the block header of the previous block. The data reference value may be a reference to the one or more data values included in the respective block. In some cases, the data reference value may be a hash value generated via the application of one or more hashing algorithms, which may be the same or different than those used in generation of the block reference value, to the one or more data values included in the block. The use of the reference values may ensure that the data stored in the blockchain is immutable, as a modification to any data value can be detected via generation of the data reference value, as it would thus differ from the value stored in the block header, which would, in turn result in a different block reference value for the subsequent block, which would carry on through every subsequent block. As a result, no block header or data value may be modified without requiring modification to every single subsequent block in the blockchain. As each node in the blockchain network 114 may store the blockchain, no modification to the blockchain may be performed without compromise of every single node.

Each of the one or more data values stored in the blocks of the blockchain may be associated with an electronic voucher. Upon receipt of the voucher request, the node in the blockchain network 114 may generate (e.g., following verification of the transaction account, if necessary) a new data value corresponding to the electronic voucher. In some cases, the entity to which the voucher request is submitted (e.g., the issuing institution 108) may generate the data value, which may be forwarded on to the node in the blockchain network 114 for use thereby. The data value may include at least the redemption amount, redemption merchant(s), and expiration date. In some cases, redemption merchants may be indicated via a merchant identifier, which may be a unique value associated with the respective merchant, such as an identification number, name, registration number, transaction account number, etc. As part of the generation of the data value, the node in the blockchain network 114 may also generate a voucher identification number. The voucher identification number may be a unique value that is associated with the electronic voucher for identification thereof that is unique to all electronic vouchers submitted to the blockchain network 114.

The node in the blockchain network 114 may include the new data value in a new block that is generated, confirmed, and added to the blockchain using methods and systems that will be apparent to persons having skill in the relevant art.

Once the electronic voucher data has been successfully added to the blockchain, the node may return a confirmation message to the sender device 110 (e.g., directly, or via an intermediate entity, such as the issuing institution 108, as applicable). The confirmation message may indicate that the voucher request was successfully processed, and may include the voucher identification number generated for the electronic voucher. The sender device 110 may then generate the electronic voucher. The electronic voucher may be a data file that includes at least payment credentials for the selected and verified transaction account and the voucher identification number. In some embodiments, the electronic voucher may be encrypted via the application program, where only other instances of the application program (e.g., on the recipient device 112 and authorized point of sale devices 102) may possess encryption keys suitable for decryption of the encrypted voucher.

One the electronic voucher has been successfully generated, the sender 104 may gift the electronic voucher to the recipient 106. The electronic voucher may be gifted via the electronic transmission of the electronic voucher from the sender device 110 to the recipient device 112. In some instances, the electronic voucher may be transmitted via the application program executed by the sender device 110 to the application program executed by the recipient device 112. In other instances, the sender device 110 and recipient device 112 may use any other suitable communication method, such as via short messaging service, multimedia messaging service, e-mail, near field communication, radio frequency, Bluetooth, etc. The recipient device 112 may receive the electronic voucher, which may then be stored therein.

Once the recipient wishes to redeem the electronic voucher, the recipient 106 may instruct the recipient device 112 to electronically transmit the electronic voucher to the point of sale device 102 using any suitable communication method. The point of sale device 102 may receive the electronic voucher in conjunction with a payment transaction being conducted between the point of sale device 102 and the recipient 106. The point of sale device 102 may receive the electronic voucher, and may verify the electronic voucher to confirm its authenticity. As part of the verification, the point of sale device 102 may receive blockchain data from the blockchain network 114, and identify a data value corresponding to the electronic voucher based on the voucher identification number. The point of sale device 102 may identify the redemption amount, merchant identifier(s), and expiration date corresponding to the voucher identification number stored in the blockchain to confirm that the electronic voucher is valid for redemption at the associated merchant, has not yet expired or been redeemed, and to identify the redemption amount available.

Once the electronic voucher is verified, the point of sale device 102 may redeem the voucher by updating a transaction amount for the payment transaction based on the available redemption amount for the electronic voucher. For instance, if the redemption amount is less than the transaction amount, the point of sale device 102 may split the payment transaction into two separate transactions, one for the redemption amount to be funded via the transaction account associated with the electronic voucher, and one for the remaining transaction amount to be funded by the recipient 106. In some embodiments, the issuing institution 108 may debit the transaction account upon generation of the electronic voucher. In such embodiments, the updating of the transaction amount may include subtracting, from the transaction amount, the redemption amount.

The point of sale device 102 may then initiate the processing of the payment transaction for the updated transaction amount (e.g., the redemption amount), by submitting an authorization request for the payment transaction to a payment network 116 for processing thereby. The authorization request may be a specially formatted transaction message that is formatted pursuant to one or more standards governing the exchange of financial transaction messages, such as the International Organization of Standardization's ISO 8583 or ISO 20022 standards, that includes a message type indicator indicative of an authorization request and a plurality of data elements configured to store data. The authorization request may include at least the updated transaction amount as well as the account credentials included in the electronic voucher. The payment network 116 may receive the authorization request and may process the payment transaction using traditional methods and systems, where the payment transaction may be funded via the transaction account selected by the sender 104 when requesting the electronic voucher. As part of the processing of the payment transaction, the issuing institution 108 may receive the authorization request, may approve the authorization request, and may update the hold on the selected transaction account accordingly, such as by removing the hold or reducing the amount of the hold based on the transaction amount (e.g., if the transaction amount is less than the redemption amount).

Once the payment transaction is successfully processed, the point of sale device 102 may be informed of the successful processing by the payment network 116, and may submit a confirmation message to the recipient device 112 informing the recipient 106 that the electronic voucher was successfully redeemed. The blockchain network 114 may be notified of the successful redemption. The notification may be submitted to the blockchain network 114 by the point of sale device 102, payment network 116, issuing institution 108, or other entity associated with the management and processing of electronic vouchers. The notification may include at least the voucher identification number, and may also include the transaction amount. A node in the blockchain network 114 may then generate and add a new data value to the blockchain that indicates that provides a new redemption amount for the electronic voucher if the initial redemption amount was not spent (e.g., it was greater than the transaction amount), or that indicates that the electronic voucher has been fully redeemed (e.g., if the transaction amount was greater than or equal to the initial redemption amount). In some embodiments, the sender device 110 may also be notified of the redemption of the electronic voucher.

In some embodiments, the system 100 may also utilize cryptographic key pairs to ensure authenticity of an electronic voucher submitted to the point of sale device 102. In such embodiments, a cryptographic key pair may be generated for each electronic voucher by any suitable entity, such as the blockchain network 114, issuing institution 108, or sender device 110. The cryptographic key pair may be comprised of a private key and a corresponding public key. The public key may be included in the voucher request and stored in the data value that is added to the blockchain for the electronic voucher. The private key may be transmitted to the sender device 110, if applicable, and stored therein. The private key may then be included in the electronic voucher, or used to generate unique data for inclusion in the electronic voucher, such as a digital signature generated using the private key via one or more signature generation algorithms. The point of sale device 102 may receive the private key, which may be verified based on the public key stored in the data value received from the blockchain network 104, or may receive the digital signature, which may be verified using the public key stored in the data value. The point of sale device 102 may thus have additional assurance that the electronic voucher is genuine.

The methods and systems discussed herein enable electronic vouchers to be generated and redeemed in a manner that is convenient to senders 104 and recipients 106, while also providing additional benefits to merchants over traditional voucher systems. The use of the blockchain to store details regarding an electronic voucher can ensure that a voucher is not counterfeit as the immutable nature of the blockchain prevents tampering or the inclusion of false data. In addition, the storing of data in the blockchain for electronic vouchers provides merchants with the ability to see all outstanding vouchers eligible for redemption with them, the redemption amounts, and expiration dates, which may be used by the merchants in forecasting sales, stocking inventory, scheduling, etc. As a result, the methods and systems discussed herein provide technological solutions to multiple problems existing in traditional voucher systems, via the use of a blockchain for data storage while separately storing account credentials in an electronic voucher that is transmitted as part of the redemption process.

Point of Sale Device

Figure 2:
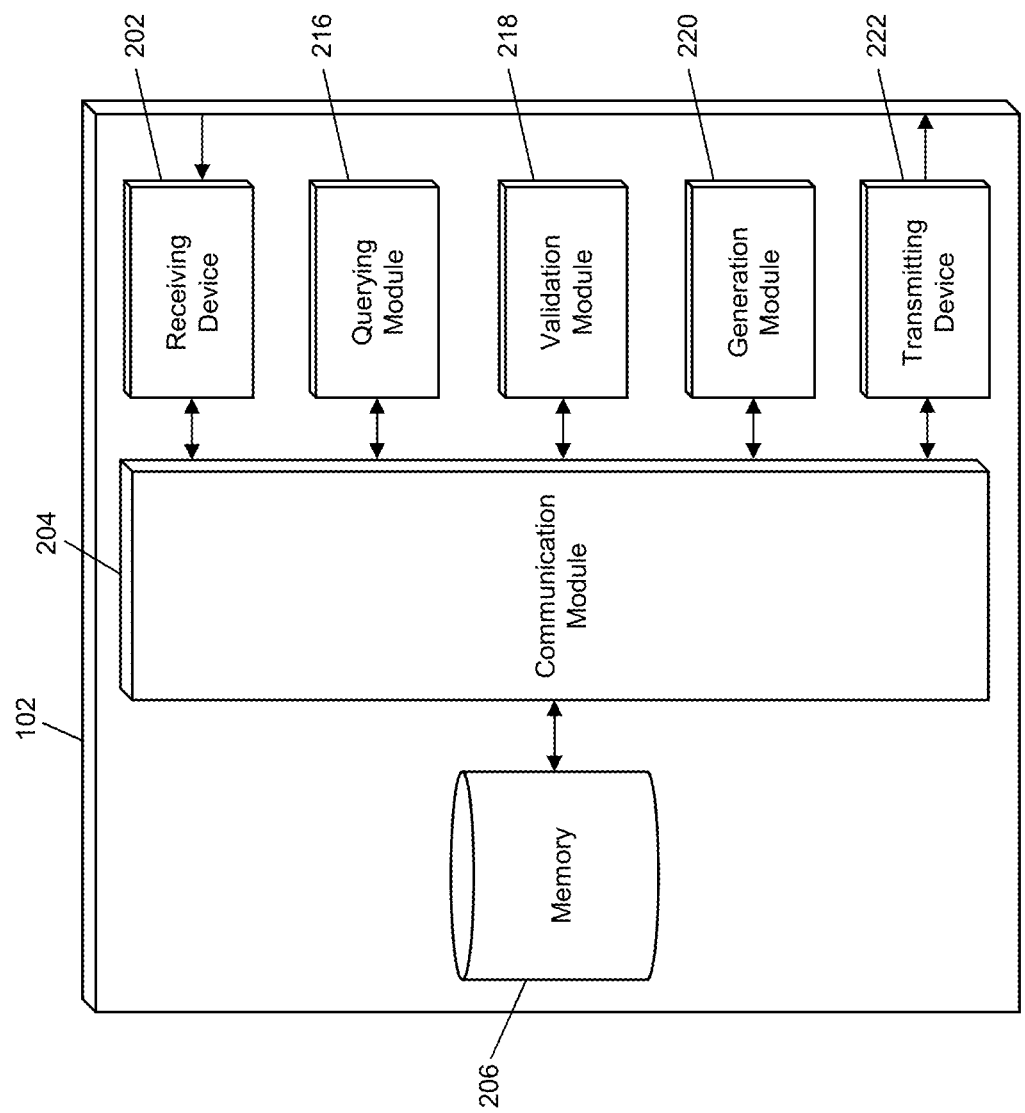
FIG. 2 is a block diagram illustrating the point of sale device of the system of FIG. 1 for the redemption of electronic vouchers via blockchain in accordance with exemplary embodiments.

FIG. 2 illustrates an embodiment of a point of sale device 102 in the system 100. It will be apparent to persons having skill in the relevant art that the embodiment of the point of sale device 102 illustrated in FIG. 2 is provided as illustration only and may not be exhaustive to all possible configurations of the point of sale device 102 suitable for performing the functions as discussed herein. For example, the computer system 600 illustrated in FIG. 6 and discussed in more detail below may be a suitable configuration of the point of sale device 102. In some embodiments, the sender device 110 may include one or more of the components of the point of sale device 102 as illustrated in FIG. 2 for performing functions associated therewith, as discussed herein.

The point of sale device 102 may include a receiving device 202. The receiving device 202 may be configured to receive data over one or more networks via one or more network protocols. In some instances, the receiving device 202 may be configured to receive data from issuing institutions 108, sender devices 110, recipient devices 112, blockchain networks 114, payment networks 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by recipient devices 112, which may be superimposed or otherwise encoded with electronic vouchers, which may be data files that include at least account credentials and a voucher identification number, and may also include additional data, such as a private key or digital signature generated therefrom. The receiving device 202 may also be configured to receive data signals electronically transmitted by blockchain nodes in the blockchain network 114, which may be superimposed or otherwise encoded with blockchain data, including blocks that include data values corresponding to electronic vouchers that may be redeemed at the associated merchant. The receiving device 202 may be further configured to receive data signals electronically transmitted by payment networks 116, which may be superimposed or otherwise encoded with authorization responses for payment transactions, which may indicate if a payment transaction is approved or denied.

The point of sale device 102 may also include a communication module 204. The communication module 204 may be configured to transmit data between modules, engines, databases, memories, and other components of the point of sale device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the point of sale device 102 and external components of the point of sale device 102, such as externally connected databases, display devices, input devices, etc. The point of sale device 102 may also include a processing device. The processing device may be configured to perform the functions of the point of sale device 102 discussed herein as will be apparent to persons having skill in the relevant art. In some embodiments, the processing device may include and/or be comprised of a plurality of engines and/or modules specially configured to perform one or more functions of the processing device, such as a querying module 216, validation module 218, generation module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

The point of sale device 102 may include a memory 206. The memory 206 may be configured to store data for use by the point of sale device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the point of sale device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store a blockchain. As discussed above, the blockchain may be comprised of a plurality of blocks, where each block may be comprised of at least a block header and one or more data values. Each block header may include a time stamp, a block reference value referring to the preceding block in the blockchain, and a data reference value referring to the one or more data values included in the respective block. The memory may also be configured to store any additional data that may be used by the point of sale device 102 in performing the functions discussed herein, such as public keys corresponding to private keys for verification of digital signatures, etc. The memory 206 may also be configured to store transaction data for payment transactions, which may include product data, transaction amounts, transaction account data, routing information, currency data, etc.

The point of sale device 102 may include a querying module 216. The querying module 216 may be configured to execute queries on databases to identify information. The querying module 216 may receive one or more data values or query strings, and may execute a query string based thereon on an indicated database, such as the memory 206, to identify information stored therein. The querying module 216 may then output the identified information to an appropriate engine or module of the point of sale device 102 as necessary. The querying module 216 may, for example, execute a query on the memory 206 to identify a transaction amount for a payment transaction for modification thereof based on a received electronic voucher and the data values associated therewith identified in the blockchain.

The point of sale device 102 may also include a validation module 218. The validation module 218 may be configured to validate data for the point of sale device 102 for use in performing the functions discussed herein. The validation module 218 may receive instructions as input, may validate data as instructed, and may output a result of the validation to another module or engine of the point of sale device 102. For example, the validation module 218 may be configured to validate digital signatures to authenticate the received electronic vouchers, and may also be configured to validate electronic vouchers themselves and validity thereof, such as based on data included in the electronic voucher and in a data value included in the blockchain associated therewith, such as comparison of an expiration date for the electronic voucher to a present date, inclusion of a merchant identifier associated with the point of sale device 102 in the blockchain data, etc.

The point of sale device 102 may also include a generation module 220. The generation module 220 may be configured to generate data for the point of sale device 102 for use in performing the functions discussed herein. The generation module 220 may receive instructions as input, may generate data based on the instructions, and may output the generated data to one or more modules or engines of the point of sale device 102. For example, the generation module 220 may be configured to generate a transaction message for a payment transaction to be conducted for redemption of an electronic voucher, which may include a modified transaction amount and account credentials included in the electronic voucher. The generation module 220 may also be configured to generate confirmation messages for transmission to recipient devices 112. In some instances, the generation module 220 may be configured to generate new data values or data for inclusion thereof, for submission to the blockchain network 114 to update the blockchain following redemption of an electronic voucher.

The point of sale device 102 may also include a transmitting device 220. The transmitting device 220 may be configured to transmit data over one or more networks via one or more network protocols. In some instances, the transmitting device 220 may be configured to transmit data to sender devices 110, recipient devices 112, issuing institutions 108, blockchain networks 114, payment networks 116, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to payment networks 116 via payment rails associated therewith, which may be superimposed or otherwise encoded with authorization requests for payment transactions, which may include account credentials received in an electronic voucher and a modified transaction amount. In some embodiments, the transmitting device 220 may be configured to electronically transmit data signals to blockchain networks 114, which may be superimposed or otherwise encoded with new data values or data for use thereof, which may include an indication of redemption of an electronic voucher including at least the voucher identification number and the transaction amount for the processed payment transaction. The transmitting device 220 may also be configured to electronically transmit data signals to recipient devices 112, which may be superimposed or otherwise encoded with a notification of redemption for an electronic voucher.

Process for Generation of an Electronic Voucher

Figure 3:
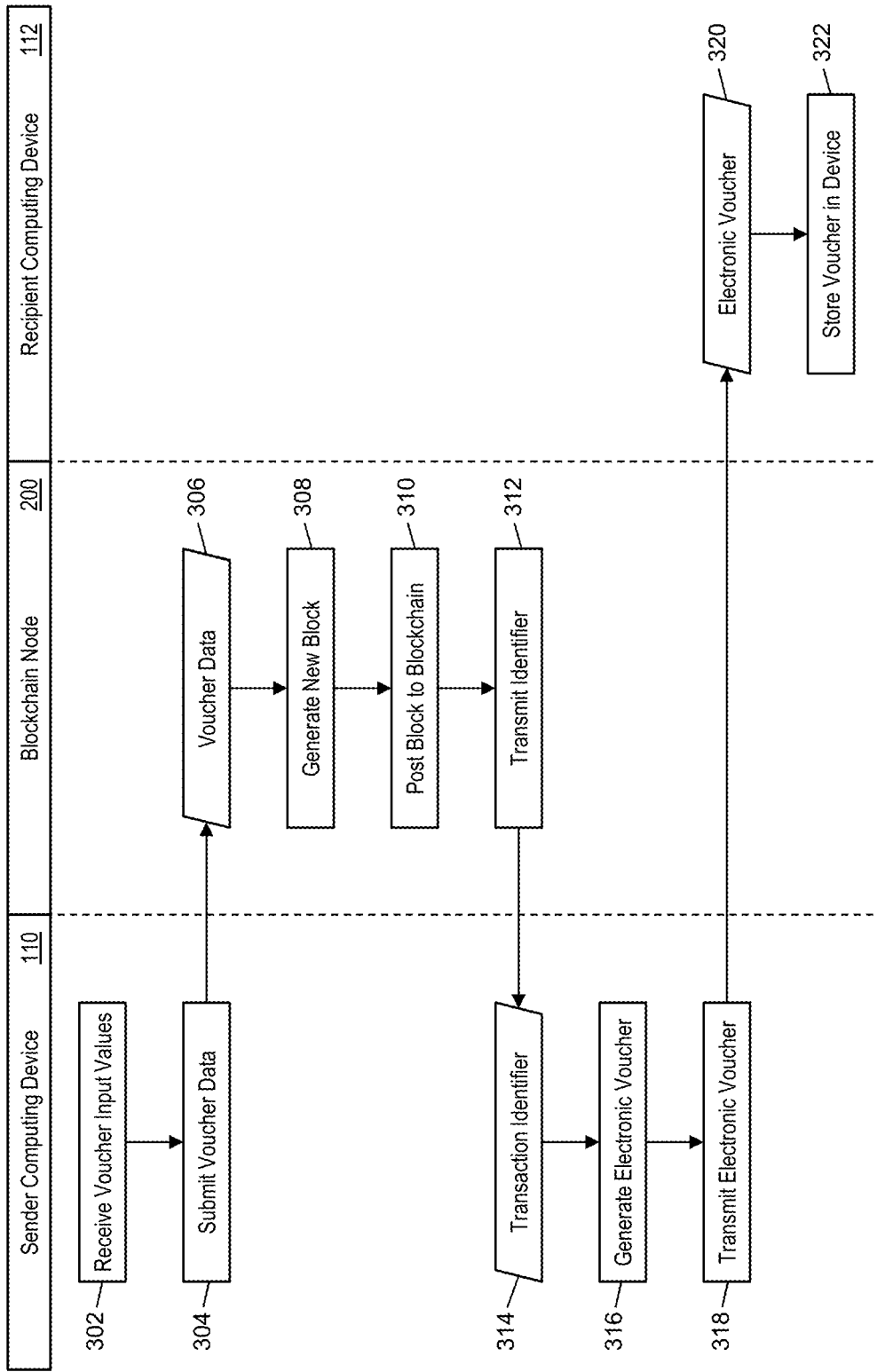
FIG. 3 is a flow diagram illustrating a process for the generation of an electronic voucher for redemption in the system of FIG. 1 in accordance with exemplary embodiments.

FIG. 3 illustrates a process for the generation of an electronic voucher utilizing the blockchain network 114 in the system 100 of FIG. 1.

In step 302, the sender device 110 may receive values input by the sender 104 for the generation of an electronic voucher. The values may include at least a selection of a transaction account, a redemption amount for the voucher, one or more merchant identifiers corresponding to merchants where the voucher may be redeemed, and an expiration date, if applicable. In step 304, the sender 104 may submit a request for the electronic voucher to a blockchain node 200 in the blockchain network 114 using the sender device 110. In some embodiments, the request may be transmitted via an issuing institution 108, which may first validate the transaction account and place a hold thereon for the redemption amount. In step 306, the blockchain node 200 may receive the voucher data in the request. In embodiments where the issuing institution 108 was not used to forward the data, the blockchain node 200 may request that the issuing institution 108 validates the transaction account selected by the sender 104.

In step 308, the blockchain node 200 may generate a new block for addition to the blockchain, wherein the data values included in the new block includes a data value corresponding to the voucher request, the data value including at least the redemption amount, merchant identifier(s), and expiration date. The data value may also include a voucher identification number, which may be generated by the blockchain node 200 as part of the generation of the new block, in step 308. Once the new block is generated, it may be confirmed by other blockchain nodes 200 in the blockchain network 114 using methods associated therewith, such as proof of work, and, in step 310, may be posted to the blockchain that is distributed across all of the blockchain nodes 200 comprising the blockchain network 114. In step 312, the blockchain node 200 may electronically transmit the voucher identification number to the sender device 110 as confirmation of the successful addition of the voucher data to the blockchain.

In step 314, the sender device 110 may receive the voucher identification number, which, in some instances, may be presented to the sender 104 or used to trigger the display of a notification to the sender 104 indicating successful addition of the voucher data to the blockchain. In step 316, the sender device 110 may generate the electronic voucher corresponding to the request. The electronic voucher may include at least the voucher identification number and the account credentials associated with the selected transaction account. The account credentials may include data suitable for use in identifying and authenticating a transaction account for funding of a payment transaction, such as a primary account number, security code, name, address, expiration date, etc. In step 318, the sender 104 may instruct the sender device 110 to electronically transmit the electronic voucher to a recipient device 112, to gift the electronic voucher to the recipient 106. In step 320, the recipient device 112 may receive the electronic voucher, which may be transmitted using any suitable communication method and system. In step 322, the recipient device 112 may store the electronic voucher therein for redemption in a future transaction.

Process for Redemption of an Electronic Voucher Via Blockchain

Figure 4:
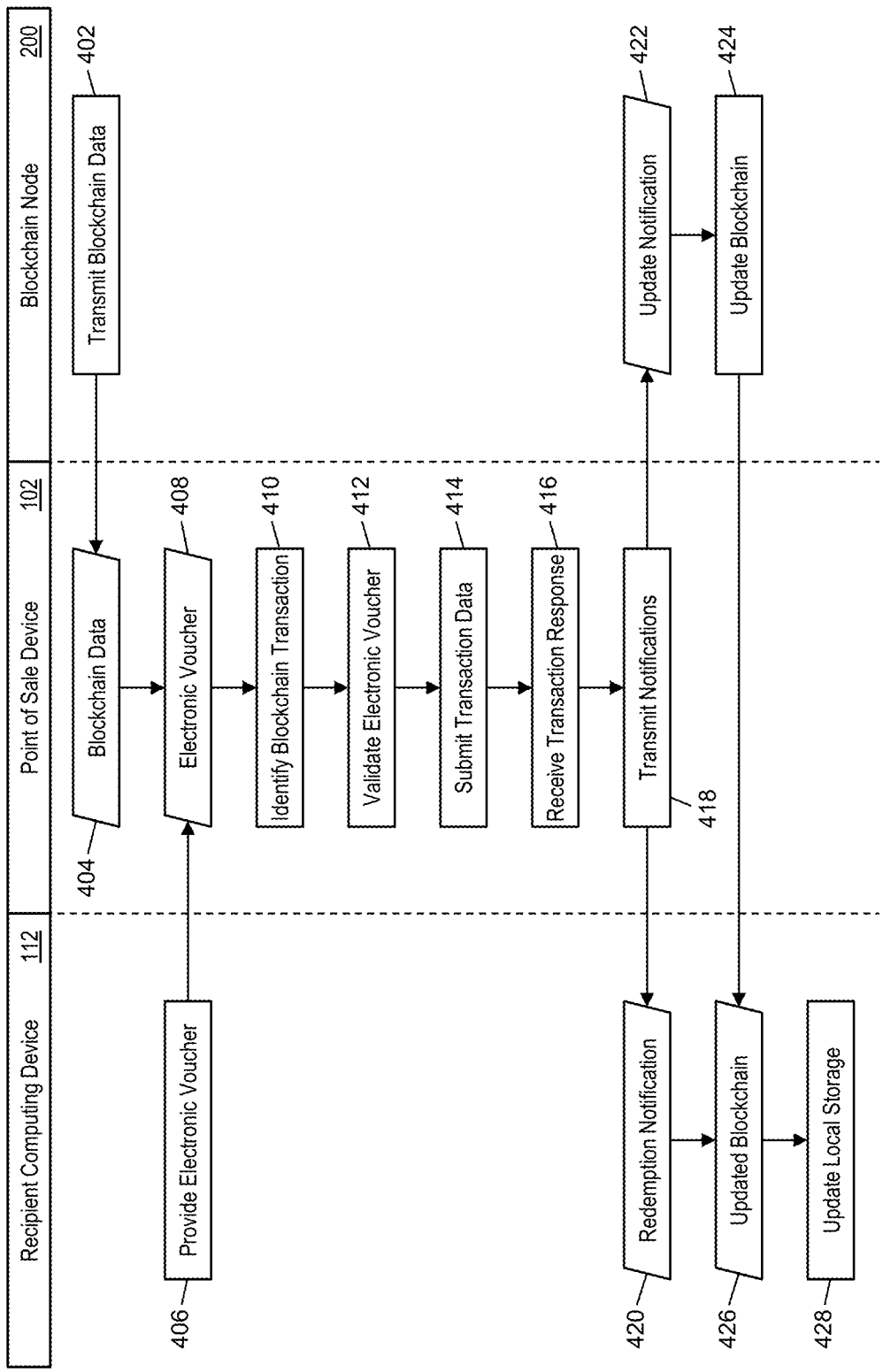
FIG. 4 is a flow diagram illustrating a process for the redemption of an electronic voucher in the system of FIG. 1 in accordance with exemplary embodiments.

FIG. 4 illustrates a process for the redemption of an electronic voucher using a blockchain in the system 100 of FIG. 1, such as may be generated and provisioned to the recipient device 112 in the process illustrated in FIG. 3 and discussed above.

In step 402, a blockchain node 200 in the blockchain network 114 may electronically transmit blockchain data to the point of sale device 102 using a suitable communication network and method, such as to keep the point of sale device 102 up to date as new blocks are added to the blockchain. In step 404, the receiving device 202 of the point of sale device 102 may receive the blockchain data, which may be stored in the memory 206 of the point of sale device 102 via the execution of a query thereon by the querying module 216 of the point of sale device 102.

In step 406, the recipient device 112 may electronically transmit an electronic voucher to the point of sale device 102 as part of a payment transaction. The electronic voucher may be electronically transmitted via submission in a web page or application program, near field communication, Bluetooth, radio frequency, or any other suitable communication method. In step 408, the receiving device 202 of the point of sale device 102 may receive the electronic voucher. The electronic voucher may include at least a voucher identification number and account credentials associated with a transaction account. In step 410, the querying module 216 of the point of sale device 102 may execute a query on the memory 206 thereof to identify one or more data values stored in a block in the blockchain that includes the voucher identification number included in the electronic voucher.

In step 412, the validation module 218 of the point of sale device 102 may validate the electronic voucher. Validation may include verifying at least that the electronic voucher is not expired, that there is an outstanding redemption amount (e.g., which may be greater or equal to the transaction amount, in some cases), that the electronic voucher is redeemable at the merchant associated with the point of sale device 102, and that the electronic voucher has not already been redeemed, which may be performed based on the data included in the identified data values and the transaction data stored in the memory 206 of the point of sale device 102 for the transaction. Upon successful validation of the electronic voucher, the point of sale device 102 may modify the payment transaction data, if applicable, and, in step 414, the transmitting device 222 of the point of sale device 102 may submit the transaction data to the payment network 116 via payment rails associated therewith for processing of the payment transaction. In some instances, the generation module 220 of the point of sale device 102 may generate a transaction message for submission directly to the payment network 116 or via one or more intermediate entities, such as an acquiring institution or a gateway processor.

In step 416, the receiving device 202 of the point of sale device 102 may receive an authorization response for the payment transaction from the payment network 116, which may indicate that the payment transaction was approved and successfully processed. In step 418, the transmitting device 222 of the point of sale device 102 may electronically transmit notifications to the recipient device 112 and blockchain node 200, notifying the respective entities of the successful redemption of the electronic voucher. The notifications may include at least the voucher identification number, and the transaction amount for which the voucher was redeemed. In cases where the redemption amount may have been less than the transaction amount, the notification may include the redemption amount or an indication that the electronic voucher was fully redeemed.

In step 420, the recipient device 112 may receive the notification of redemption, and may, in some cases, display a message to the recipient 106 indicating that their electronic voucher was successfully redeemed. In step 422, the blockchain node 200 may receive the notification of redemption. In step 424, the blockchain node 200 may update the blockchain by including a new data value in a new block added thereto that includes an updated redemption amount, which may be modified based on the amount included in the notification. In instances where the electronic voucher is fully redeemed, the data value may indicate that the electronic voucher may no longer be used. In some cases, the blockchain node 200 may generate a new voucher identification number, which may be used in the new data value in place of the original voucher identification number. In step 426, the recipient device 112 may receive the updated blockchain that includes the new data value. In cases where a new voucher identification number is generated, the blockchain node may be configured to electronically transmit a notification to the recipient device 112 (e.g., or to another party for forwarding to the recipient device 112, such as the point of sale device 102, sender device 110, etc.) that includes the new voucher identifier. In step 428, the recipient device 112 may update local storage to modify the electronic voucher and other data associated therewith (e.g., amount left redeemable, etc.).

Exemplary Method for Redemption of an Electronic Voucher Via Blockchain

Figure 5:
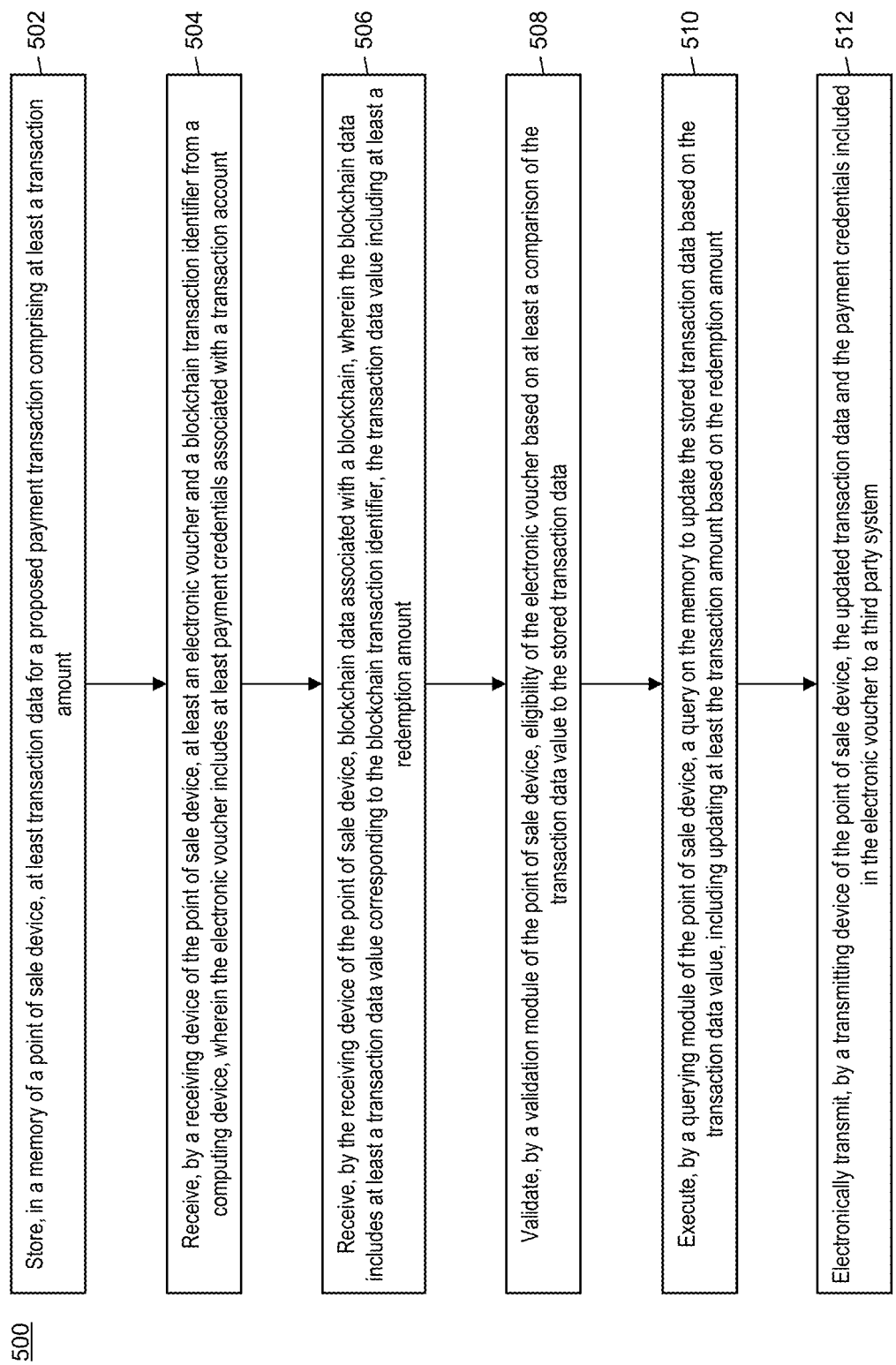
FIG. 5 is a flow chart illustrating an exemplary method for redemption of an electronic voucher via blockchain in accordance with exemplary embodiments.

FIG. 5 illustrates a method 500 for the redemption of an electronic voucher received from a first source that is verified via blockchain obtained from a second source at a point of sale device as part of the initiation of a payment transaction.

In step 502, transaction data for a proposed payment transaction may be stored in a memory (e.g., the memory 206) of a point of sale device (e.g., the point of sale device 102), wherein the transaction data includes at least a transaction amount. In step 504, at least an electronic voucher and a blockchain transaction identifier may be received from a computing device (e.g., the recipient device 112) by a receiving device (e.g., the receiving device 202) of the point of sale device, wherein the electronic voucher includes at least payment credentials associated with a transaction account. In step 506, blockchain data associated with a blockchain may be received by the receiving device of the point of sale device, wherein the blockchain data includes at least a transaction data value corresponding to the blockchain transaction identifier, the transaction data value including at least a redemption amount.

In step 508, eligibility of the electronic voucher may be validated by a validation module (e.g., the validation module 218) of the point of sale device based on at least a comparison of the transaction data value to the stored transaction data. In step 510, a query may be executed on the memory of the point of sale device by a querying module (e.g., the querying module 216) of the point of sale device to update the stored transaction data based on the transaction data value, including updating at least the transaction amount based on the redemption amount. In step 512, the updated transaction data and the payment credentials included in the electronic voucher may be electronically transmitted by a transmitting device (e.g., the transmitting device 222) of the point of sale device to a third party system (e.g., the payment network 116).

In one embodiment, the electronic voucher may further include a voucher identification number, the transaction data value may further include the voucher identification number, and validation of the eligibility of the electronic voucher may be further based on inclusion of the same voucher identification number in the transaction data value as included in the electronic voucher. In some embodiments, validation of the eligibility of the electronic voucher may be successful if the redemption amount is greater than or equal to the transaction amount. In one embodiment, the memory may further include a merchant identification value associated with the point of sale device, the transaction data value may further include the merchant identification value, and validation of the eligibility of the electronic voucher may be further based on inclusion of the same merchant identification value in the transaction data value as included in the electronic voucher.

In some embodiments, the transaction data value may further include an expiration date, and validation of the eligibility of the electronic voucher may be further based on a comparison of a present date to the expiration date included in the transaction data value. In one embodiment, the method 500 may further include generating, by a generation module (e.g., the generation module 220) of the point of sale device, a transaction message for the proposed payment transaction, wherein the transaction message is formatted based on one or more standards and includes at least a plurality of data elements including data elements configured to store the transaction data and payment credentials, wherein electronically transmitting the updated transaction data and the payment credentials to a third party system includes electronically transmitting the transaction message to a payment network (e.g., the payment network 116) using payment rails associated therewith.

In some embodiments, the method 500 may also include: receiving, by the receiving device of the point of sale device, a data message including at least an indication of approval or denial of the proposed payment transaction, and electronically transmitting, by the transmitting device of the point of sale device, the indication of approval or denial to the computing device. In a further embodiment, the data message may further include a processed transaction amount, and the processed transaction amount may be included in the transmission to the computing device.

Computer System Architecture

Figure 6:
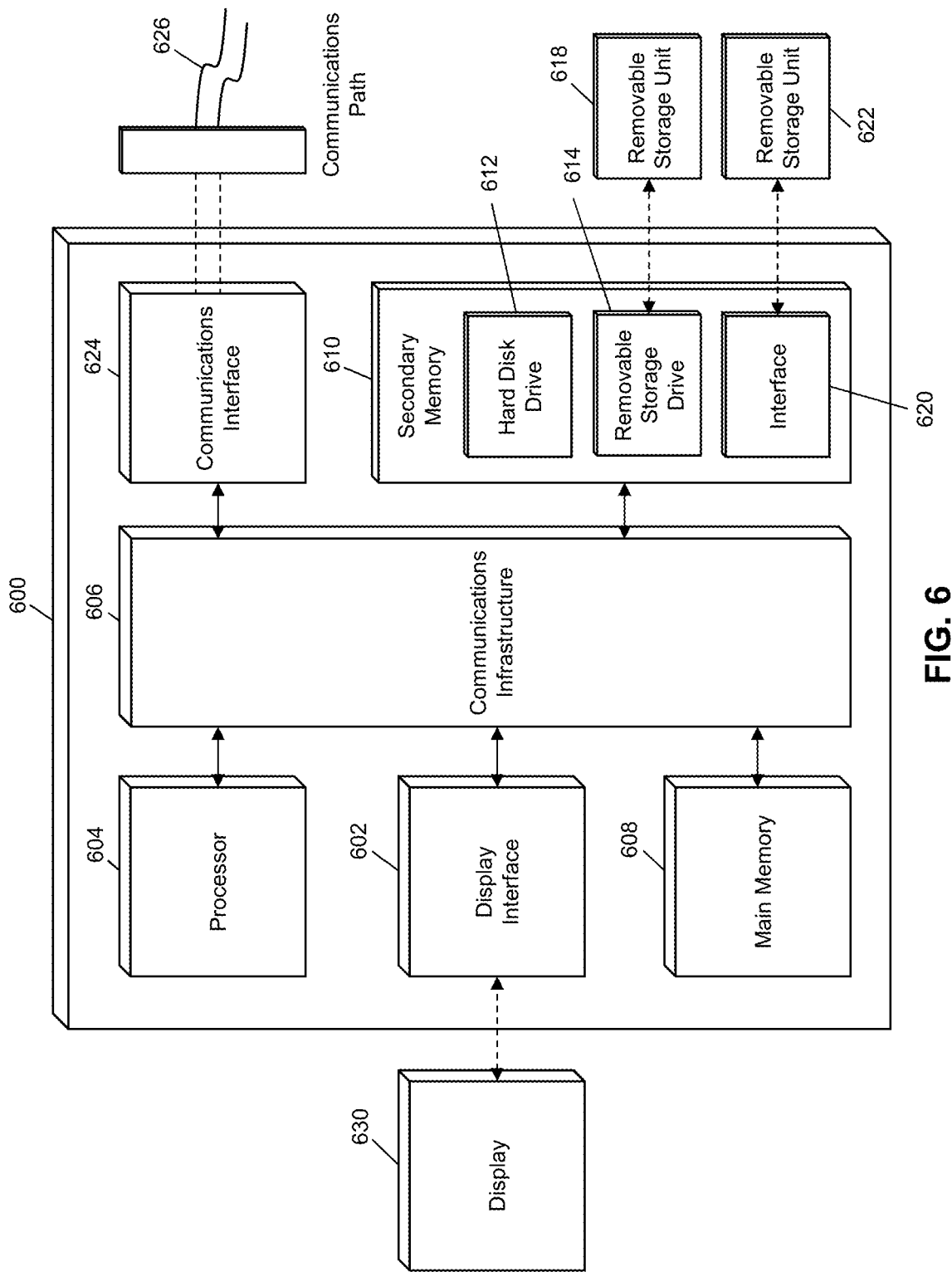
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the point of sale device 102 or sender device 110 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for redemption of electronic vouchers via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for redemption of an electronic voucher via blockchain, comprising:

storing, in a memory of a point of sale device, at least transaction data for a proposed payment transaction comprising at least a transaction amount;

receiving, by the point of sale device, at least an electronic voucher and a blockchain transaction identifier from a computing device, the electronic voucher including an original voucher identification number for a first transaction and configured to receive a newly generated voucher identification number to be used in place of the original voucher identification number after the first transaction, and wherein the electronic voucher includes at least payment credentials associated with a transaction account;

receiving, by the point of sale device, blockchain data associated with a blockchain from a node included in a blockchain network, wherein the blockchain data includes at least a transaction data value corresponding to the blockchain transaction identifier, the transaction data value including at least a redemption amount, and where the blockchain data and the blockchain are publicly accessible;

validating, by the point of sale device, eligibility of the electronic voucher based on at least a comparison of the transaction data value to the stored transaction data;

executing, by the point of sale device, a query on the memory to update the stored transaction data based on the transaction data value, including updating at least the transaction amount based on the redemption amount;

generating, by the point of sale device, a transaction message for the proposed payment transaction, wherein the transaction message is formatted based on one or more standards and includes at least a plurality of data elements including data elements configured to store the updated transaction data and the payment credentials;

electronically transmitting, by the point of sale device, the updated transaction data and the payment credentials included in the electronic voucher to a third party system via payment rails for processing of the proposed payment transaction, and wherein the electronically transmitting of the updated transaction data and the payment credentials to the third party system includes electronically transmitting the transaction message to a payment network using the payment rails associated with the payment network;

receiving, on the point of sale device, an authorization response for the payment transaction from the payment network indicating that the payment transaction was approved and successfully processed;

electronically transmitting, by the point of sale device, notifications to the computing device and the node in the blockchain network, notifying the respective entities of the successful redemption of the electronic voucher, the notifications including at least the original voucher identification number, and the transaction amount for which the voucher was redeemed;

updating, by the node in the blockchain, the blockchain by including a new data value in a new block added to the blockchain that includes an updated redemption amount and the newly generated voucher identification number generated by the blockchain node; and receiving, on the computing device, the updated blockchain that includes the new data value and updating a local storage on the computing device to modify the electronic voucher and other data associated with the electronic voucher including the newly generated voucher identification number.

2. The method of claim 1, wherein
the transaction data value further includes the original voucher identification number or the newly generated voucher identification number of the electronic voucher; and
validation of the eligibility of the electronic voucher is further based on inclusion of the same voucher identification number in the transaction data value as included in the electronic voucher.

3. The method of claim 1, wherein validation of the eligibility of the electronic voucher is successful if the redemption amount is greater than or equal to the transaction amount.

4. The method of claim 1, wherein
the memory further includes a merchant identification value associated with the point of sale device,
the transaction data value further includes the merchant identification value, and
validation of the eligibility of the electronic voucher is further based on inclusion of the same merchant identification value in the transaction data value as included in the electronic voucher.

5. The method of claim 1, wherein
the transaction data value further includes an expiration date, and
validation of the eligibility of the electronic voucher is further based on a comparison of a present date to the expiration date included in the transaction data value.

6. The method of claim 1, further comprising:
receiving, by the point of sale device, a data message including at least an indication of approval or denial of the proposed payment transaction; and
electronically transmitting, by the point of sale device, the indication of approval or denial to the computing device.

7. The method of claim 6, wherein
the data message further includes a processed transaction amount, and
the processed transaction amount is included in the transmission to the computing device.

8. A system for redemption of an electronic voucher via blockchain, comprising:
a memory of a point of sale device configured to store at least transaction data for a proposed payment transaction comprising at least a transaction amount;
a processor of the point of sale device configured to
receive at least an electronic voucher and a blockchain transaction identifier from a computing device, the electronic voucher including an original voucher identification number for a first transaction and configured to receive a newly generated voucher identification number to be used in place of the original voucher identification number after the first transaction, and wherein the electronic voucher includes at least payment credentials associated with a transaction account, and
receive blockchain data associated with a blockchain from a node included in a blockchain network, wherein the blockchain data includes at least a transaction data value corresponding to the blockchain transaction identifier, the transaction data value including at least a redemption amount, and where the blockchain data and the blockchain are publicly accessible;
validate eligibility of the electronic voucher based on at least a comparison of the transaction data value to the stored transaction data;
execute a query on the memory to update the stored transaction data based on the transaction data value, including updating at least the transaction amount based on the redemption amount;
generate a transaction message for the proposed payment transaction, wherein the transaction message is formatted based on one or more standards and includes at least a plurality of data elements including data elements configured to store the updated transaction data and the payment credentials;
electronically transmit the updated transaction data and the payment credentials included in the electronic voucher to a third party system via payment rails for processing of the proposed payment transaction, and wherein the electronically transmitting of the updated transaction data and the payment credentials to the third party system includes electronically transmitting the transaction message to a payment network using the payment rails associated with the payment network;
receive an authorization response for the payment transaction from the payment network indicating that the payment transaction was approved and successfully processed; and
electronically transmit notifications to the computing device and the node in the blockchain network, notifying the respective entities of the successful redemption of the electronic voucher, the notifications including at least the original voucher identification number, and the transaction amount for which the voucher was redeemed;
wherein the node in the blockchain is configured to update the blockchain by including a new data value in a new block added to the blockchain that includes an updated redemption amount and the newly generated voucher identification number generated by the blockchain node; and
the computing device receives the updated blockchain that includes the new data value and a local storage on the computing device is updated to modify the electronic voucher and other data associated with the electronic voucher including the newly generated voucher identification number generated by the blockchain node.

9. The system of claim 8, wherein
the transaction data value further includes the original voucher identification number or the newly generated voucher identification number of the electronic voucher; and
validation of the eligibility of the electronic voucher is further based on inclusion of the same voucher identification number in the transaction data value as included in the electronic voucher.

10. The system of claim 8, wherein validation of the eligibility of the electronic voucher is successful if the redemption amount is greater than or equal to the transaction amount.

11. The system of claim 8, wherein
the memory of the point of sale device further includes a merchant identification value associated with the point of sale device,
the transaction data value further includes the merchant identification value, and validation of the eligibility of the electronic voucher is further based on inclusion of the same merchant identification value in the transaction data value as included in the electronic voucher.

12. The system of claim 8, wherein the transaction data value further includes an expiration date, and validation of the eligibility of the electronic voucher is further based on a comparison of a present date to the expiration date included in the transaction data value.

13. The system of claim 8, wherein the processor of the point of sale device is further configured to:

receive a data message including at least an indication of approval or denial of the proposed payment transaction; and electronically transmit the indication of approval or denial to the computing device.

14. The system of claim 13, wherein the data message further includes a processed transaction amount, and the processed transaction amount is included in the transmission to the computing device.

* * * * *